UNITED STATES PATENT OFFICE.

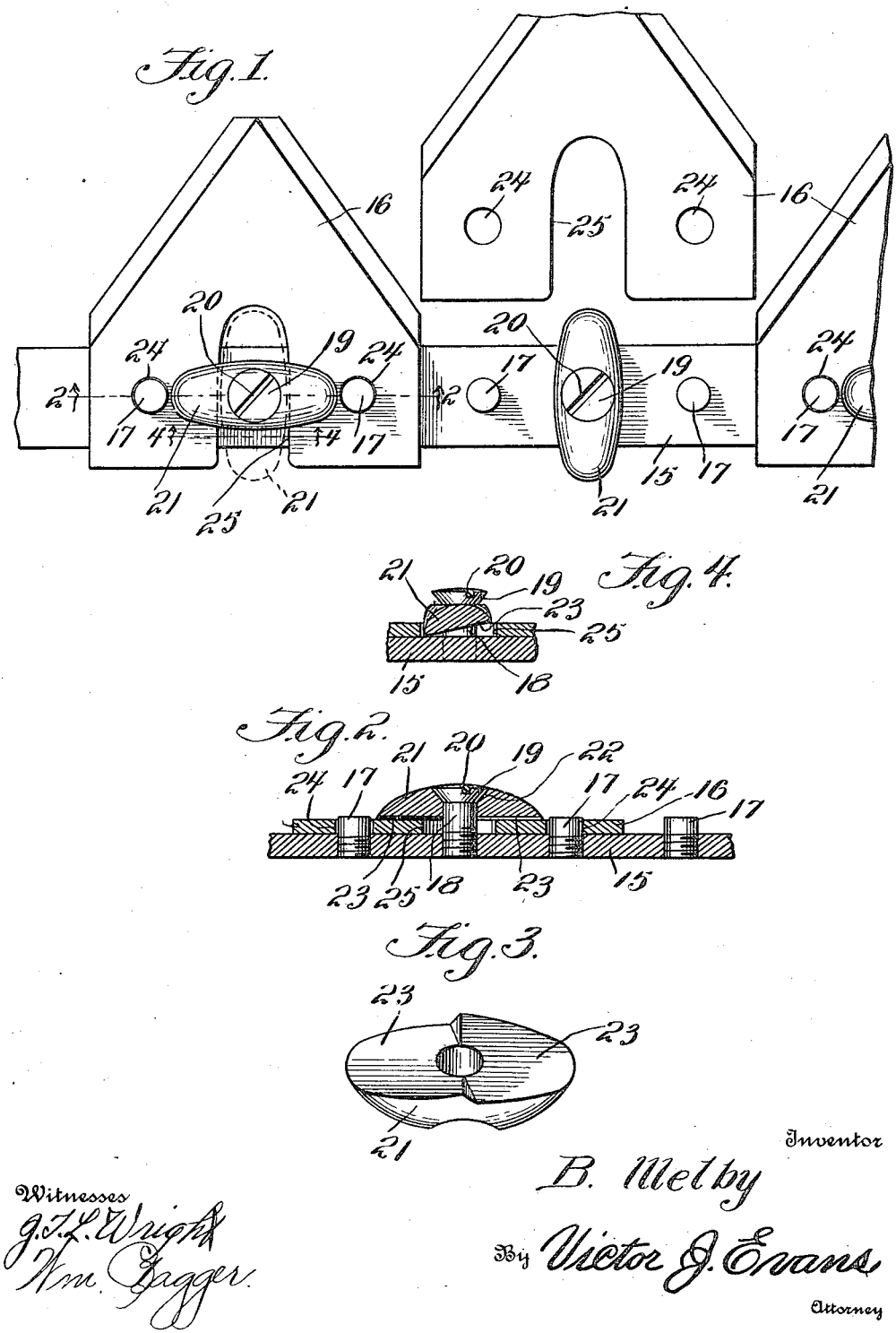

BENJAMIN MELBY, OF ASHBY, MINNESOTA.

CUTTING APPARATUS.

1,214,345. Specification of Letters Patent. Patented Jan. 30, 1917.

Application filed February 16, 1915. Serial No. 8,663.

*To all whom it may concern:*

Be it known that I, BENJAMIN MELBY, a citizen of the United States, residing at Ashby, in the county of Grant and State of Minnesota, have invented new and useful Improvements in Cutting Apparatus, of which the following is a specification.

This invention relates to cutting apparatus for harvesters and mowing machines, and it has particular reference to improved means for securing the knives or cutting blades upon the sickle bar in such a manner as to be readily detachable for the purpose of enabling new blades to be substituted in the event of injury or breakage.

The invention has for its object to produce a simple and improved construction whereby the individual blades may be detachably mounted and securely held without necessity for the use of special tools in demounting and remounting the blades.

A further object of the invention is to produce a simple and effective construction whereby the blades may be detached and remounted without possibility of error and without the use of skilled labor.

With these and other ends in view which will readily appear as the nature of the invention is better understood, the same consists in the improved construction and novel arrangement and combination of parts which will be hereinafter fully described and particularly pointed out in the claim.

In the accompanying drawing has been illustrated a simple and preferred form of the invention, it being, however, understood that no limitation is necessarily made to the precise structural details therein exhibited, but that changes, alterations and modifications within the scope of the claim may be resorted to when desired.

In the drawing, Figure 1 is a top plan view showing a portion of a sickle bar having a blade connected therewith and showing where additional blades may be mounted. Fig. 2 is a vertical sectional view taken on the line 2—2 in Fig. 1. Fig. 3 is a perspective view showing the fastening member detached, said member being inverted to expose the bottom face thereof. Fig. 4 is a sectional detail view showing the fastening member in a position at right angles to that seen in Fig. 2.

Corresponding parts in the several figures are denoted by like characters of reference.

The sickle bar 15 is provided for the attachment of each individual knife or cutting blade 16 with two upstanding lugs 17 and with a screw 18 arranged midway between said upstanding lugs, said screw having a flaring head 19 which may be notched, as shown at 20, to permit tightening thereof by means of an ordinary screw driver. The lugs 17 may consist of pins having threaded engagement with the sickle bar, as shown in Fig. 2. The screw 18 likewise has threaded engagement with the sickle bar, but that portion of said screw which extends above the top edge of the sickle bar is preferably unthreaded and smooth. On said unthreaded portion is mounted a fastening member 21 consisting of an oblong or oval button, the same having a smooth convex upper face and a double cam-shaped lower face, said button being centrally apertured for the passage of the screw, and the aperture being reamed out or enlarged at its upper end, as seen at 22, for the reception of the flaring screw head. The two ends of the bottom faces of the fastening members are slightly slanted in opposite directions transversely of the button, to produce a double cam, as will be best seen at 23 in Fig. 3 of the drawings, where said slant has been exaggerated in order that it may be plainly seen. Each individual knife or cutting member 16 is provided with apertures 24 to engage the respective lugs 17 and with a central notch 25 extending forwardly from the rear edge thereof for the accommodation of the screw 18.

In operation, after assembling the screw 18 and the fastening member 21 with the sickle bar the fastening member, which virtually constitutes a turn button, is turned transversely of the sickle bar, thus enabling the knife to be placed in position on the sickle bar with the apertures 24 engaging the lugs 17 and with the notch 25 straddling the screw 18. By turning the member 21 to a position lengthwise of the cutter bar, the said member will by the cam action of the oppositely slanted end portions of its bottom face force the knife into close contact with the sickle bar and hold it securely. Any needed adjustment of the screw to enable the cam faces of the turn button to effectively engage the top face of the knife at opposite sides of the notch 25 may be conveniently effected at any time by the use of an ordinary screw driver. The exposed portion or top face of the fastening member is rounded and perfectly smooth so as to offer no obstruction whereon cut grass and other material may lodge.

Having thus described the invention, what is claimed as new, is:—

A sickle bar having upstanding lugs, a headed screw engaging the sickle bar midway between said lugs, and a turn button fitted on the screw, said turn button having the two ends of its bottom face slanted transversely in opposite directions to produce a double cam, in combination with a cutting member having apertures to engage the upstanding lugs and a notch extending forwardly from the rear edge thereof to engage the bolt member, the double cam face of the turn button being adapted to engage the top face of the cutting member adjacent to opposite sides of the notch, and the turn button being adjustable by the screw to produce the proper pressure upon the face of the cutting member.

In testimony whereof I affix my signature in presence of two witnesses.

BENJAMIN MELBY.

Witnesses:
 JOSEPH P. BRENDAL,
 BENNIE J. JOHNSON.

Copies of this patent may be obtained for five cents each, by addressing the "Commissioner of Patents, Washington, D. C."